United States Patent [19]
Hordijk

[11] Patent Number: 5,124,954
[45] Date of Patent: Jun. 23, 1992

[54] METHOD OF, AND APPARATUS FOR, DETECTING THE POSITION OF AN OBJECT

[75] Inventor: Jan Hordijk, CL Aalten, Netherlands

[73] Assignee: Staalkat B.V., Aalten, Netherlands

[21] Appl. No.: 588,543

[22] Filed: Sep. 26, 1990

[30] Foreign Application Priority Data

Sep. 28, 1989 [NL] Netherlands ................ 8902413

[51] Int. Cl.⁵ .................................. H01S 15/00
[52] U.S. Cl. ............................. 367/99; 367/98
[58] Field of Search ............. 367/98, 99, 93, 901; 342/159, 162; 356/4

[56] References Cited

U.S. PATENT DOCUMENTS

| | | | |
|---|---|---|---|
| 3,399,404 | 8/1968 | Githens et al. | 342/90 |
| 3,422,435 | 1/1969 | Cragon et al. | 342/91 |
| 4,382,291 | 5/1983 | Nakauchi | 367/93 |
| 4,639,902 | 1/1987 | Leverance et al. | 367/93 |
| 4,952,911 | 8/1990 | D'Ambrosia | 356/4 |

FOREIGN PATENT DOCUMENTS 0026385 9/1980 European Pat. Off.
3002148 10/1981 Fed. Rep. of Germany.
2594555 4/1987 France.

*Primary Examiner*—Daniel T. Pihulic
*Attorney, Agent, or Firm*—Griffin Branigan & Butler

[57] ABSTRACT

This invention relates to a method of, and apparatus for, detecting the position of an object relative to a detector device, in which a pulse signal is transmitted to such object by a transmitter means, and a receiver means receives a signal reflected by the object, the position of the object being determined in dependence upon the time difference between the moment the transmitter means transmits the pulse signal and the moment the receiver means receives the reflected signal. According to the invention, to eliminate the effect of spurious signals, a reference signal stored in a memory means is subtracted from the signal received by the receiver means, which reference signal has previously been received by the receiver means in response to a signal transmitted by the transmitter means in the absence of an object whose position is to be detected.

13 Claims, 3 Drawing Sheets

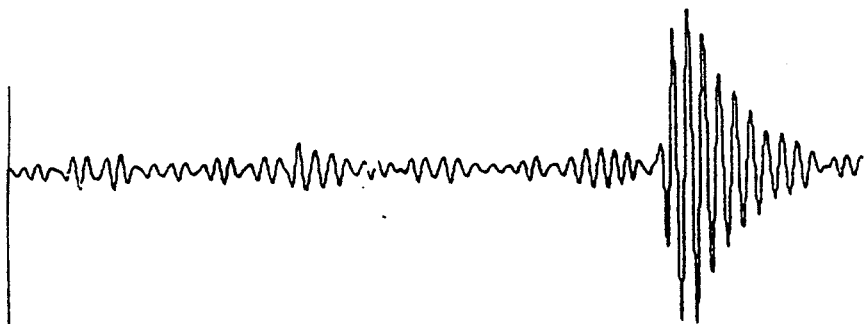
FIG.3a
FIG.3b
FIG.3c
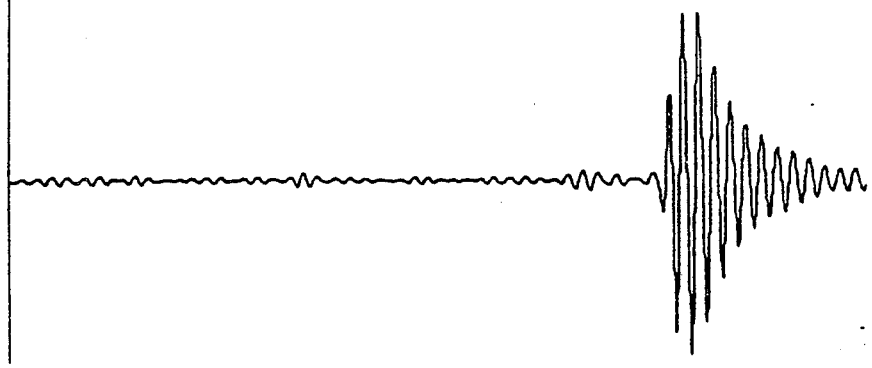
FIG.4a
FIG.4b
FIG.4c

METHOD OF, AND APPARATUS FOR, DETECTING THE POSITION OF AN OBJECT

This invention relates to a method of detecting the position of an object relative to a detector device, in which a pulse signal is transmitted to such object by a transmitter means, and a receiver means receives a signal reflected by the object, the position of the object being determined in dependence upon the time difference between the moment the transmitter means transmits the pulse signal and the moment the receiver means receives the reflected signal.

The invention further relates to apparatus for carrying out the method.

Such a method and apparatus are generally known. The signals may be in the form of electro-magnetic radiation, for example, with radar, or, for example, ultrasonic audio signals.

A problem which may present itself is that the receiver means may detect a signal not coming from the object to be detected. Such a signal not coming from the object to be detected, to be referred to hereinafter by the term "spurious signal", may, for example, come from objects present in the surroundings, or from a direct reception by the receiver means of the signal transmitted by the transmitter means. A cause related to the latter cause may occur specifically in case an ultrasonic transmitter means and an ultrasonic receiver means are housed in a common housing, or where one device performs the functions of both transmitter means and receiver means: the common housing may then transmit the ultrasonic audio signal from the transmitter means to the receiver means. In such a situation it is even possible for the common housing to start resonating and to generate a spurious signal to the receiver means which lasts considerably longer than does the original signal transmitted by the transmitter means, and may even still be present when the receiver means receives the signal reflected by the object. The known method and apparatus then no longer make it possible to discriminate between the spurious signal and the signal actually reflected by the object to be detected, so that no reliable position detection can take place.

It is an object of the present invention to provide a method and an apparatus of the above kind in which the disadvantages referred to do not occur, or at any rate to a lesser extent.

For this purpose, there is provided a method of the above kind which is characterized, in accordance with this invention, in that a reference signal stored in a memory means is subtracted from the signal received by the receiver means, which reference signal has previously been received by the receiver means in response to a signal transmitted by the transmitter means in the absence of an object whose position is to be detected.

The reference signal detected in the absence of such an object is representative of the response of the "surroundings" to the signal to be transmitted by the transmitter means, and contains all of the possible contributions as described above. Thus the reference signal is representative of the spurious signal to be expected, so long as the condition is satisfied that any objects causing such spurious signals are stationary relative to the detection means, and that each time an identical signal is transmitted. It will be clear that when the signals reflected by the "spurious" objects may be neglected on account of the attenuation which occurs, this condition need not be satisfied. A mechanical coupling between the transmitter means and the receiver means, caused by a common housing, will always cause a substantially identical spurious signal.

As the signal received by the receiver means in the absence of an object may be regarded as an addition of the previously known spurious signal and the signal reflected by the object, the signal reflected by the object can be derived from the signal received by the receiver means by subtracting from it the reference signal representative of the spurious signal. Preferably, the reference signal is stored in digital form in a digital memory, it being further preferable for the subtraction to be carried out on the digitized reference signal and the likewise digitized received signal.

According to one embodiment of the method according to this invention, the reference signal is measured once and stored in a ROM-type memory. Such a procedure can be carried out, for example, during the manufacture of a combination of a transmitter means and a receiver means set up in a common housing. The reference signal used during the subtraction is then always the same, which is sufficient when, for example, correction is only needed for a spurious signal caused by a mechanical coupling between the transmitter means and the receiver means, caused by the common housing.

According to a further embodiment of the method according to this invention, the reference signal is measured repeatedly and stored in a RAM-type memory. In this way, varying effects, such as those resulting from aging or changes in temperature, can be eliminated.

Some preferred embodiments of the apparatus according to this invention will now be described, by way of example, with reference to the accompanying drawings, in which.

FIGS. 3a–c illustrate a first example of a signal corrected in accordance with this invention; and FIGS. 4a–c illustrate a second example of a signal corrected in accordance with this invention.

Figure 1:
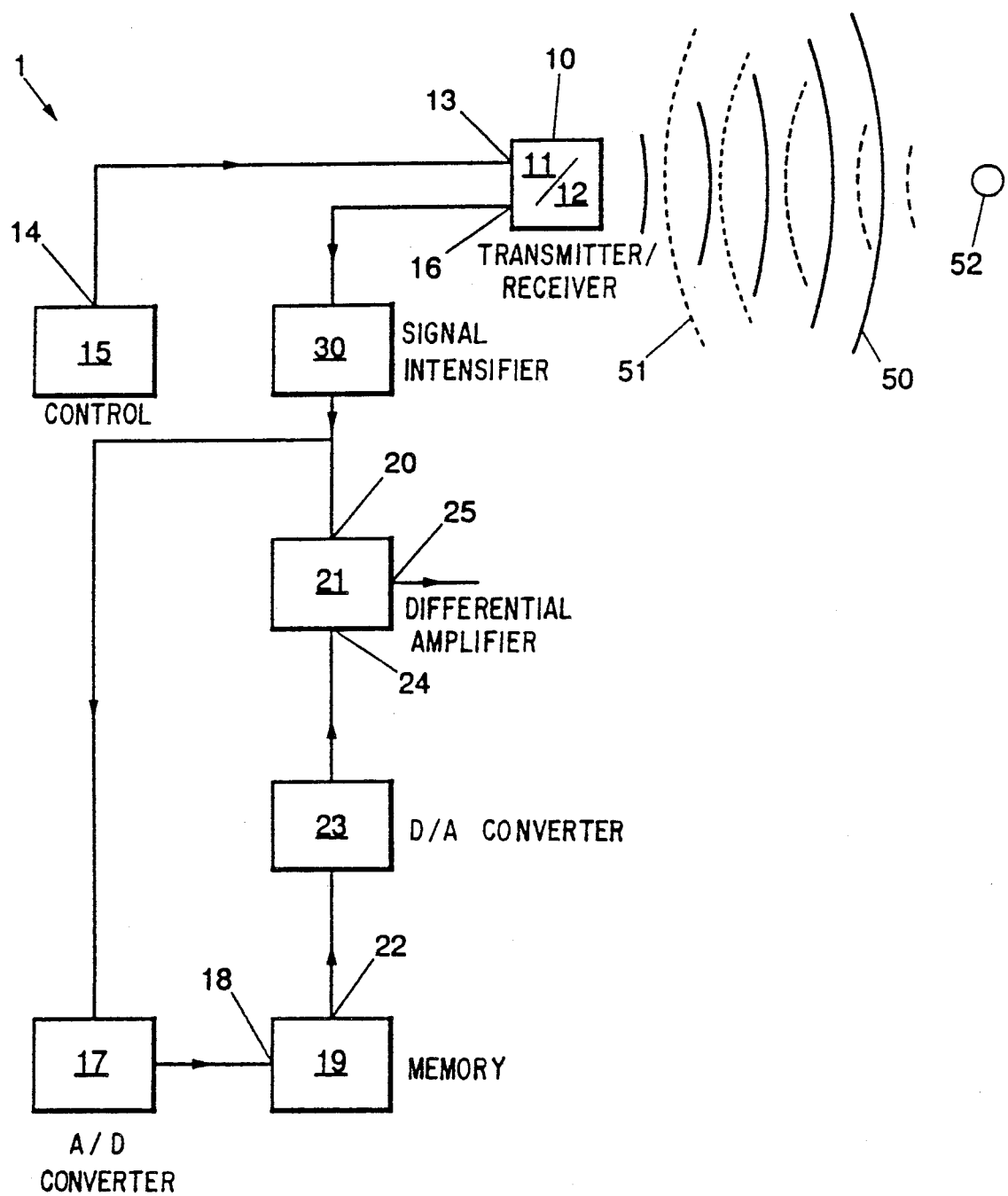
FIG. 1 shows a block diagram of a first preferred embodiment of the apparatus according to the present invention.

In FIG. 1, an apparatus for detecting the position of an object is designated generally by the reference numeral 1. Apparatus 1 is, by way of example, suitable for detection by means of ultrasonic audio signals, and comprises a transmitter means 11 and a receiver means 12 which, likewise by way of example, are housed in a common housing 10. A control input 13 of the transmitter means 11 is connected to an output terminal 14 of a control means 15. Upon receiving a suitable control signal from the control means 15, transmitter means 11 transmits a pulse-type ultrasonic signal 50. As will be described hereinafter, this pulse-type ultrasonic signal 50 comprises generally a plurality of cycles of an audio signal with an ultrasonic frequency.

The receiver means 12 provides at an output terminal 16 an electrical signal which is representative of the ultrasonic signal 51 received by receiver means 12. The output terminal 16 of receiver means 12 is coupled through an analogue-to-digital converter 17 to a data input 18 of a memory means 19, which in the example shown is a ROM-type memory means, for storing the reference signal in memory means 19 in digitized form during a first measuring procedure in the absence of an object. The term ROM (Read Only Memory) is used herein to refer to a memory or store which can be read only. If desired, the output signal of receiver means 12 is first intensified by an intensifier means 30 in order to bring the signal level to a suitable value for further processing. The output terminal 16 of the receiver means 12 is further coupled to a non-inverting input 20 of an analogue differential amplifier 21 for processing a signal received in the presence of an object 52 during a second measuring procedure. A data output 22 of memory means 19 is coupled through a digital-to-analogue converter 23 to an inverting input 24 of the differential amplifier 21. The differential amplifier 21 thus provides at an output 25 an electrical signal which is representative of the reflected signals stripped of spurious influences.

Figure 2:
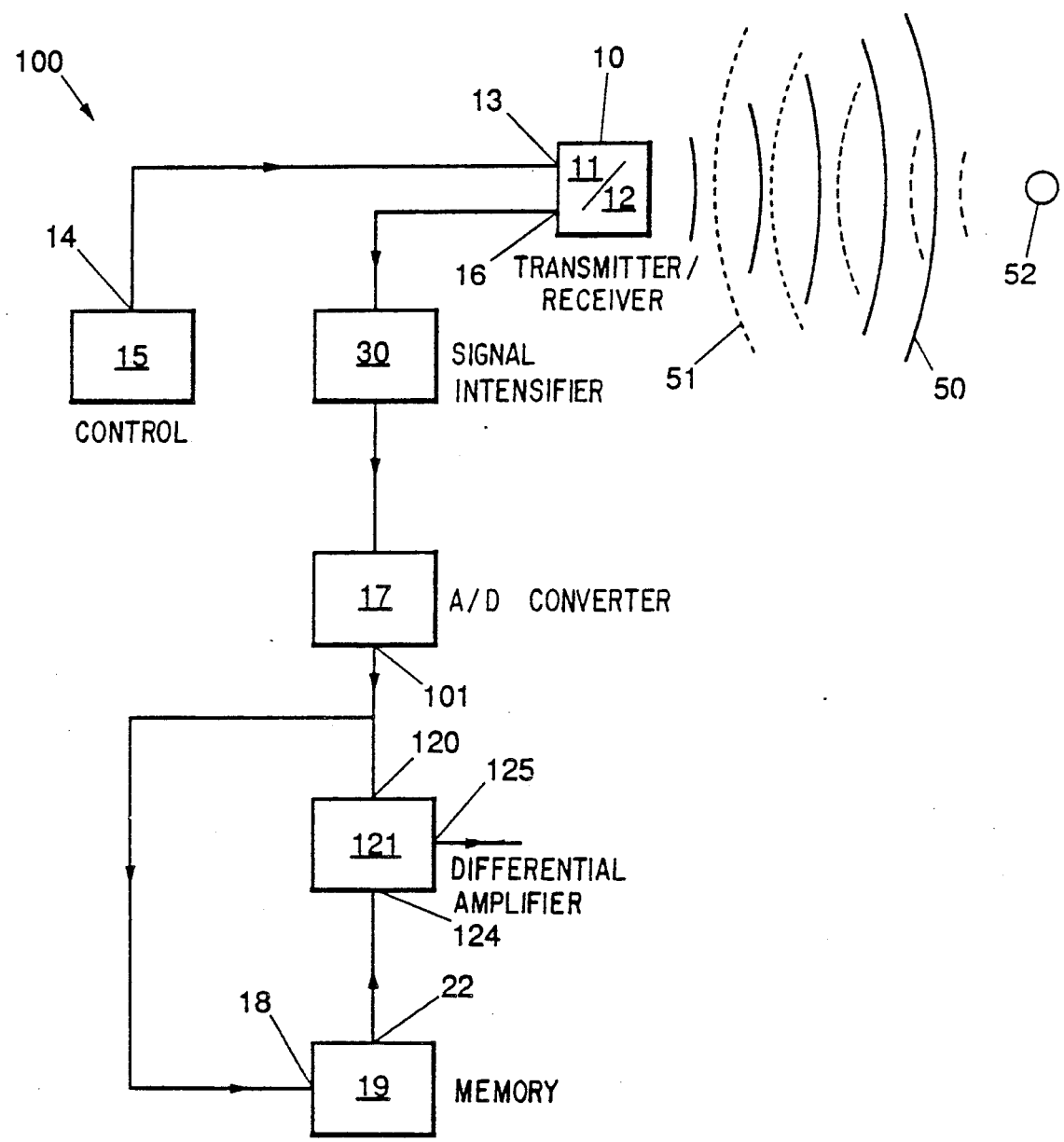
FIG. 2 shows a block diagram of a second preferred embodiment of the apparatus according to the present invention.

In FIG. 2, a different embodiment of an apparatus for detecting the position of an object in accordance with the present invention is designated generally by the reference numeral 100. In FIGS. 1 and 2, like parts are designated by like reference numerals. In the embodiment shown in FIG. 2, the memory means 19 is a RAM-type memory. The term RAM (Random Access Memory) is used herein to refer to a store or memory randomly accessible for writing or reading operations. A non-inverting input 120 of a digital differential amplifier 121 is coupled to the output 101 of the analogue-to-digital converter 17. In the signal path between the data output 22 of memory means 19 and an inverting input 124 of the differential amplifier 121, no digital-to-analogue converter is now needed. The differential amplifier 121 thus provides at an output 125 a digital signal representative of the pure reflected signal.

FIG. 3b shows a graphic representation of an electrical signal representative of the signal received in the absence of an object, and stored in memory means 19. FIG. 3a shows a graphic representation of an electrical signal representative of the signal received from an object, to which signal a slight contribution has been made by the spurious signal. FIG. 3c shows a graphic representation of the signal of FIG. 3a after the reference signal shown in FIG. 3b has been subtracted from it. The differential signal thus provided at the output 25, 125 of subtractor means 21, 121 is representative of the pure signal reflected by the object 52. It can be clearly seen in FIG. 3c that the reflected signal, which as regards form corresponds to the signal transmitted by transmitter means 11, comprises a pulse-type signal which includes a plurality of cycles of an audio signal with an ultrasonic frequency. The signals shown in FIG. 4 are comparable to those shown in FIG. 3, except that, in FIG. 4a, the contribution of the spurious signal shown in FIG. 4b is relatively much larger than in FIG. 3a, so that it is difficult to recognize the pure reflected signal in the signal shown in FIG. 4a. FIG. 4c shows the signal corrected in accordance with the present invention, in which the reflected signal can be recognized.

It will be clear to those skilled in the art that the embodiments of the apparatus according to this invention shown and described herein can be varied or modified without departing from the inventive idea or the scope of protection. Thus, for example, in the subtraction operation, the signal received may be subtracted from the reference signal, it being irrelevant for obtaining a time indication whether the signal received changes in sign.

I claim:

1. In a method for determining the distance of a subject object relative to a detection device, in which a pulsed test signal is transmitted to the subject object and surrounding objects, received signals are received by reflection from the subject object and by reflection or generation from the surrounding objects, and the relative distance of the subject object is determined by the time lapse between the test signal and the received signals at the detection device, the improvement comprising:
   (a) transmitting a pulsed control signal to the surrounding objects in the absence of the subject object;
   (b) receiving a reference signal comprising signals reflected from or generated from said surrounding objects, which reference signal constitutes noise in said determination;
   (c) storing the reference signal;
   (d) transmitting a pulsed test signal to the surrounding objects in the presence of the subject object;
   (e) receiving a return signal;
   (f) subtracting the stored reference signal from the return signal so as to eliminate the noise from the return signal and improve the signal-to-noise ratio thereof; and
   (g) determining the distance of the subject object relative to the detection device from the said time lapse based on the improved signal-to-noise ratio return signal.

2. A method as claimed in claim 1, wherein the reference signal is stored in a digital memory in digital form.

3. A method as claimed in claim 1, wherein the subtraction is carried out on a digitized reference signal and a digitized received signal.

4. A method as claimed in claim 1, wherein the reference signal is measured once and stored in a ROM-type memory means.

5. A method as claimed in claim 1, wherein the reference signal is measured repeatedly and stored in a RAM-type memory means.

6. In a apparatus for determining the distance of a subject object relative to a detection device, in which a transmitter means transmits a pulsed test signal to the subject object and surrounding objects, a receiver means receives received signals by reflection from the subject object and reflection or generation from surrounding objects, and the relative distance of the subject object is determined by means for determining the time lapse between the test signal and the received signals at the detection device, the improvement comprising:
   (a) transmitting means for transmitting a pulsed control signal to the surrounding objects in the absence of the subject object;
   (b) receiving means for receiving a reference signal comprising signals reflected from or generated from said surrounding objects, which reference signal constitutes noise in said determination;
   (c) memory means for storing the reference signal;
   (d) transmitting means for transmitting a pulsed test signal to the surrounding objects in the presence of the subject object;
   (e) receiving means for receiving a return signal;
   (f) subtractor means for subtracting the stored reference signal from the return signal so as to eliminate the noise from the return signal and improve the signal-to-noise ratio thereof; and (g) means for determining the distance of the subject object relative to the detection device from said time lapse based on the improved signal-to-noise ratio return signal.

7. Apparatus as claimed in claim 6, wherein said memory means is a digital memory means.

8. Apparatus as claimed in claim 6, wherein said subtractor means is suitable for subtracting digital signals.

9. Apparatus as claimed in claim 6, wherein said subtractor means is suitable for subtracting analogue signals.

10. Apparatus as claimed in claim 6, wherein said memory means is a ROM-type memory means.

11. Apparatus as claimed in claim 6, wherein said memory means is a RAM-type memory means.

12. Apparatus as claimed in claim 6, wherein the transmitting means for transmitting the control signal is the same transmitting means for transmitting the test signal.

13. Apparatus as claimed in claim 12, wherein the receiving means for receiving the reference signal is the same receiving means for receiving the return signal.

* * * * *